United States Patent [19]

Rausa et al.

[11] Patent Number: 5,112,501
[45] Date of Patent: May 12, 1992

[54] METHOD FOR REDUCING INDUSTRIAL OR URBAN EFFLUENT COD

[75] Inventors: Riccardo Rausa; Vincenzo Calemma; Roberto Menicagli, all of San Donato Milanese, Italy

[73] Assignee: Eniricerche S.p.A., Milan, Italy

[21] Appl. No.: 488,659

[22] Filed: Mar. 5, 1990

[30] Foreign Application Priority Data

Mar. 10, 1989 [IT] Italy ............................. 19735 A/89

[51] Int. Cl.⁵ .............................................. C02F 1/54
[52] U.S. Cl. .................................... 210/730; 210/725; 210/729; 210/724
[58] Field of Search ................. 210/724, 725, 729, 730

[56] References Cited

U.S. PATENT DOCUMENTS

| | | | |
|---|---|---|---|
| 2,200,784 | 5/1940 | Wallace | 210/730 |
| 2,415,439 | 1/1942 | Nelson | 210/730 |
| 2,993,006 | 7/1961 | Allen et al. | 210/730 |
| 3,872,002 | 3/1975 | Musgrove | 210/730 |
| 4,764,442 | 5/1988 | Calemma et al. | 210/730 |

FOREIGN PATENT DOCUMENTS

| | | | |
|---|---|---|---|
| 0237122 | 9/1987 | European Pat. Off. | 210/730 |
| 57-19084 | 2/1982 | Japan | 210/730 |
| 58-6286 | 1/1983 | Japan . | |
| 1204534 | 9/1970 | United Kingdom | 210/730 |

OTHER PUBLICATIONS

"Humic Acids By Dry Oxidation of Coal With Air Under Pressure, Analytical And Spectroseopic Characteristics", *Proceedings of the 1989 International Conference on Coal Science*, vol. 1, pp. 237–240, 1989.

*Primary Examiner*—Stanley S. Silverman
*Assistant Examiner*—Neil M. McCarthy
*Attorney, Agent, or Firm*—Shea & Gould

[57] ABSTRACT

A method for reducing industrial or urban effluent COD is described, comprising treating said effluents with an aqueous solution of alkaline and/or ammonium salts or humic acids perpared by the dry oxidation of coal with oxygen or oxygen/nitrogen mixtures at a temperture of between 120 and 350° C. at an oxygen partial pressure of between 0.1 and 10 ata for a contact time of between 15 and 600 minutes, followed by extraction of the crude oxidation product with an alkaline and/or ammoniacal solution, characterised in that said aqueous solution is fed into effluent, the pH of which has been previously adjusted to between 1 and 3.5, to the extent that the humic acid salts which exhibit flocculating action are in a concentration of less than or equal to 2000 mg/1 of effluent.

4 Claims, No Drawings

METHOD FOR REDUCING INDUSTRIAL OR URBAN EFFLUENT COD

FIELD OF THE INVENTION

This invention relates to a method for reducing industrial or urban effluent COD (Chemical Oxygen Demand) by means of regenerated humic acids.

BACKGROUND OF THE INVENTION

COD reduction has been under study for many years. The subject is of considerable practical interest because of the importance of effluent pollution.

From patent application JP/58006286-A it is known to use humic acids of various origin as flocculating agents for removing pollutants present in certain types of effluent.

In said patent application COD reduction is obtained by using these acids together, however, with inorganic flocculating agents (in particular a solution of a polyvalent metal such as $FeCl_3$), operating with a final pH of between 6 and 7.

It has now been found that if said acids are used under particular operating conditions there is no need for the presence of inorganic flocculating agents as used in the method of the cited Japanese application.

Humic acids are a heterogeneous class of macromolecular organic acids which form when plant constituents (lignin etc.) are decomposed by micro-organisms under aerobic conditions; they can either be extracted from soils, lignites etc. or be prepared from coal by oxidative degradation using various oxidants ($O_2$, $KMnO_4$, $HNO_3$ etc.).

In the second case the humic acids are defined as "regenerated", and although they probably differ structurally from those of natural origin they have a marked resemblance to them in terms of their elemental composition, properties and functional groups.

SUMMARY OF THE INVENTION

The method for reducing industrial or urban COD according to the present invention comprises treating said effluents with an aqueous solution of alkaline and/or ammonium salts of humic acids prepared by the dry oxidation of coal with oxygen or oxygen/nitrogen mixtures at a temperature of between 120° and 350° C. at an oxygen partial pressure of between 0.1 and 10 ata for a contact time of between 15 and 600 minutes, followed by extraction of the crude oxidation product with an alkaline and/or ammoniacal solution, characterised in that said aqueous solution is fed into effluent, the pH of which has been previously adjusted to between 1 and 3.5, to the extent that the humic acid salts which exhibit flocculating action are in a concentration of equal to or less than 2000 mg/l of effluent.

DETAILED DESCRIPTION OF THE INVENTION

The concentration of the humic acid salts in the effluent to be treated depends on the types of organic substances contained therein. It is preferably less than 1000 mg/l, more preferably less than 500 mg/l and even more preferably between 100 and 300 mg/l.

The original coals from which the humic acids used in the method of the invention are obtained are preferably chosen from the range extending from lignite to bituminous coals.

In the case of humic acids obtained from lignite the oxidation is preferably effected at a temperature of between 150° and 225° C. at an oxygen partial pressure of between 0.1 and 2 ata for a contact time of between 15 and 360 minutes.

In the case of humic acids obtained from sub-bituminous coals the oxidation is preferably effected at a temperature of between 175° and 250° C. at an oxygen partial pressure of between 0.5 and 3 ata for a contact time of between 15 and 360 minutes.

In the case of humic acids obtained from bituminous coals the oxidation is preferably effected at a temperature of between 220° and 300° C. at an oxygen partial pressure of between 1 and 5 ata for a contact time of between 15 and 360 minutes.

The method of obtaining said humic acids from coal has already been described in the U.S. Pat. No. 4,746,442 of the present applicant, to which reference should be made for further details.

The following examples are given to better illustrate the invention but without in any way being limitative thereof.

EXAMPLES 1-4

The samples subjected to the reduction tests were effluents from the production of synthetic acrylonitrile latexes used for rubber production (Examples 1 and 2), urban effluents (Example 3) and a phenol solution of various concentrations (Example 4).

Table 1 shows the characteristics of these samples in terms of pH and COD. Before carrying out the tests, some of these where necessary were centrifuged to remove particulate matter from the solution. After measuring the pH of an aliquot of solution the pollutant load was determined by the RSA E-007 volumetric method. During the tests the concentration of the phenol solution was determined by the IRSA E-014 colorimetric method.

The reduction tests were conducted using humic acids having the characteristics shown in Table 2.

The industrial effluents were tested at pH 2 and the urban effluents and phenol solution at pH 3.5. The procedure followed for the removal tests on the industrial effluents was as follows: the humic acids (2 g) were dissolved in about 20 cc of 0.1N sodium hydroxide and the solution obtained was made up to volume in a 100 ml volumetric flask by adding distilled water. A quantity of this sodium humate solution was then added to a measured volume (500 ml) of effluent solution adjusted to the desired pH value with 6N sulphuric acid, such that the humic acid concentration in the final solution was 100 mg/l. It was left to flocculate, after which an aliquot (5 ml) of the supernatant was withdrawn for COD determination. Further humate solution was added to the remainder, and the decanting and withdrawal of an aliquot for analysis were repeated until a constant COD was attained. It was found on termination of the overall treatment that the total quantity of humic acids added was between 200 and 400 mg per liter of treated solution, depending on the particular case, as shown in Table 3. In the case of urban effluents and the phenol solution the sodium humate solutions used were of greater concentration, namely 1-2 g/l, the pH of the treated solutions being 3.5. In each case the test results were related to the values of blank tests conducted by carrying out the same operations as used in the reduction tests, but without adding the sodium humate solution.

The results are given in Tables 3 and 4.

TABLE 1

Effluents used in the COD reduction tests

| EXAMPLE | EFFLUENT | pH | COD |
|---|---|---|---|
| 1 | industrial | 7 | 5690 |
| 2 | industrial | 7 | 13695 |
| 3 | urban | 7.6 | 204 |
| 4 | phenol solution | — | — |

TABLE 2

Some analytical characteristics of the humic acid sample used

Preparation procedure: oxidation of the N. Dakota lignite
T = 200° C.
P(air) = 8 ata
t = 2 hours Analytical characteristics:
moisture content = 3.0%
ash content = 1.0%

% C (daf) = 66.7    Total acidity (meq/g daf) = 9.6
% H (daf) = 3.7    COOH (meq/g daf) = 3.5
% N (daf) = 1.1    phenolic OH (meq/g daf) = 6.1
% S (daf) = 0.4
% O (diff) = 28.1

TABLE 3

Variation in industrial effluent COD after adding humic acids

| substrate | pH | humic acid conc. (mg/l) | COD (mgO$_2$/l) | % in soln. (initial) | % in soln. (blank) | % reduction |
|---|---|---|---|---|---|---|
| Industrial effluent | 7 | — | 5690 | 100 | — | — |
|  | 2 | — | 3730 | 65 | 100 | 35* |
| Example 1 | 2 | 100 | 842 | 15 | 23 | 77 |
|  | 2 | 200 | 706 | 13 | 19 | 81 |
|  | 2 | 300 | 690 | 12 | 19 | 81 |
|  | 5.5 | 100 | >2500 |  |  |  |
| Industrial effluent | 7 | — | 13695 | 100 | — | — |
|  | 2 | — | 11410 | 83 | 100 | 17* |
| Example 2 | 2 | 100 | 3660 | 27 | 32 | 68 |
|  | 2 | 200 | 2740 | 20 | 24 | 76 |
|  | 2 | 300 | 850 | 6 | 7 | 93 |
|  | 2 | 400 | 830 | 6 | 7 | 93 |

*referred to initial value at pH 7

TABLE 4

COD and pollutant concentration variation in substrates of different origin (Example 3)
Urban effluents: humic acid addition = 2000 mg/l of effluent

| pH | COD (mgO$_2$/l) | humic acids (mg/l) | % pollutant load in solution | % pollutant load reduction (total) |
|---|---|---|---|---|
| 7.6 | 204 | — | 100 | — |
| 3.5 | 172 | — | 84 | 16 |
| 3.5 | 40 | 2000 | 20 | 80 |

(Example 4)

TABLE 4-continued

COD and pollutant concentration variation in substrates of different origin

Phenol solution: pH = 3.5; humic acid addition = 1000 mg/l effluent

| initial phenol conc (mg/l) | final phenol conc (mg/l) | % phenol in soln after treatment | % phenol reduction |
|---|---|---|---|
| 200 | 58 | 29.0 | 71.0 |
| 1000 | 50 | 5.0 | 95.0 |
| 2000 | 46 | 2.3 | 97.7 |

We claim:

1. A method of reducing industrial or urban effluent chemical oxygen demand due to the presence of organic material comprising:

a) adjusting the pH of the effluent to between 1 and 3.5;

b) treating said adjusted effluent with an aqueous solution of alkaline salts, ammonium salts or a mixture of alkaline and ammonium salts of humic acids, at a concentration of no more than 2000 mg/l of effluent and in the absence of inorganic flocculating agents, said salts being prepared by the dry oxidation of coal with oxygen, nitrogen, or a mixture of oxygen and nitrogen at a temperature of between 120° and 350° C. at an oxygen partial pressure of between 0.1 and 10 atmospheres for a contact time of between 15 and 600 minutes, and thereafter extracting the crude oxidation product with an alkaline solution, an ammoniacal solution or a mixture of said alkaline and ammoniacal solutions.

2. The method of claim 1 wherein the humic acid salts are present at a concentration of less than 1000 mg/l.

3. The method of claim 2 wherein the humic acid salts are present at a concentration of less than 500 mg/l.

4. The method of claim 3 wherein the humic acid salts are present at a concentration of between 100 and 300 mg/l.

* * * * *

UNITED STATES PATENT AND TRADEMARK OFFICE
CERTIFICATE OF CORRECTION

PATENT NO. : 5,112,501
DATED : May 12, 1992
INVENTOR(S) : Riccardo Rausa, Vincenzo Calemma & Roberto Menicagli It is certified that error appears in the above-identified patent and that said Letters Patent is hereby corrected as shown below:

Column 4:

In Claim 1, in line 3 of section b), after the word "acids", there should be inserted --which exhibit flocculating action--.

Signed and Sealed this

Seventh Day of September, 1993

Attest:

BRUCE LEHMAN

Attesting Officer

Commissioner of Patents and Trademarks